(12) United States Patent
Wu

(10) Patent No.: US 7,963,233 B2
(45) Date of Patent: Jun. 21, 2011

(54) MOUSE PAD HAVING MASSAGE FUNCTION

(76) Inventor: Chichun Wu, Dongguan (CN)

( * ) Notice: Subject to any disclaimer, the term of this patent is extended or adjusted under 35 U.S.C. 154(b) by 413 days.

(21) Appl. No.: 12/136,591

(22) Filed: Jun. 10, 2008

(65) Prior Publication Data
US 2009/0078170 A1  Mar. 26, 2009

(30) Foreign Application Priority Data

Sep. 24, 2007 (CN) .................. 2007 2 0057383 U

(51) Int. Cl.
A47B 23/00 (2006.01)
A61H 7/00 (2006.01)
(52) U.S. Cl. ........... 108/43; 248/918; 345/163; 601/134
(58) Field of Classification Search .................... 108/43, 108/50.01, 50.02; 248/918, 118, 118.1, 118.5, 248/346.01, 346.05; 601/112, 134; 463/37; 345/163, 22, 27, 113, 115, 118
See application file for complete search history.

(56) References Cited

U.S. PATENT DOCUMENTS

| 5,704,902 | A * | 1/1998 | Vandenbelt et al. | 601/70 |
| 7,121,214 | B1 * | 10/2006 | Toltzman et al. | 108/43 |
| 7,182,739 | B2 * | 2/2007 | Kopanic et al. | 601/70 |
| 2001/0009263 | A1 * | 7/2001 | Chou | 248/118 |
| 2002/0148933 | A1 * | 10/2002 | Lin | 248/118 |
| 2003/0227374 | A1 * | 12/2003 | Ling et al. | 340/407.1 |
| 2004/0178304 | A1 * | 9/2004 | Lando | 248/118 |
| 2005/0121562 | A1 * | 6/2005 | Baumgardner | 248/118.1 |
| 2007/0176073 | A1 * | 8/2007 | Simic | 248/918 |
| 2007/0188451 | A1 * | 8/2007 | Sun | 345/163 |
| 2008/0023597 | A1 * | 1/2008 | Wyner et al. | 248/118.3 |
| 2009/0177129 | A1 * | 7/2009 | Chan et al. | 601/134 |

* cited by examiner

Primary Examiner — José V Chen
(74) Attorney, Agent, or Firm — Global IP Services; Tiamhua Gu

(57) ABSTRACT

A mouse pad includes a pad plate and a rotary massage device disposed on a side of the pad plate. The massage device includes a massage head and a wheel box fixed on the pad plate. A motor and a transmission mechanism driven by the motor are mounted in the wheel box. The massage head connects with the transmission mechanism so as to be rotated and extends above the wheel box for massaging the operator's wrist. In a preferable embodiment, the transmission mechanism includes a worm, a double-gear and a gear wheel. The worm is disposed on an output shaft of the motor and engages with the double-gear, the double-gear engages with the gear wheel, and the massage head connects with the gear wheel. Such mouse pad not only has the functions as the conventional mouse pad has, but also can massage the operator's wrist to ease the weariness of the wrist while operating a computer mouse thereon, thus to achieve a health care effect.

15 Claims, 10 Drawing Sheets

MOUSE PAD HAVING MASSAGE FUNCTION

CROSS REFERENCE TO THE RELATED PATENT APPLICATION

This patent application claims the priority of the Chinese patent application No. 200720057383.1 filed on Sep. 24, 2007, which application is incorporated herein by reference.

FIELD OF THE INVENTION

The present invention relates to a mouse pad for operation of a computer mouse thereon, and more particularly to a mouse pad which has massage function and health care effect on the operator's wrist.

BACKGROUND OF THE INVENTION

As we all know, having operated a computer mouse for a comparatively long time, we would feel pain, numbness and fatigue in the wrist. This is mainly because our hand should keep lifting slightly while operating the mouse and maintain this gesture for a long time which results that blood circulation of the hand is not expedite and the wrist keeps in a state of tension.

Conventional mouse pads selling in the current market are basically the mouse pads having a single function for operation of the computer mouse thereon, and mostly are designed in the perspective of improving the mouse's sensitivity, so it is not able to ease the weariness of the wrist caused by operating the mouse too long time. Recently, a new kind of mouse pads having the function of protecting the wrist has emerged in the market, and these pads mostly have a protruding capsule at a position relative to the operation part of the wrist. Though the protruding capsule can support the operator's wrist to lift up and improve the operator's comfort to some extent, it can not ease the wrist muscle to achieve the health care effect.

Hence, a strong need has arisen for providing an improved mouse pad more comfortable and having health care effect on the wrist.

SUMMARY OF THE INVENTION

Accordingly, an object of the present invention is to provide a mouse pad having massage function, which is able to massage the operator's wrist in the process of operating a computer mouse on the mouse pad and, accordingly relaxing the wrist, promoting the blood circulation, improving the operator's comfort and playing a good healthcare role to the wrist.

Another object of the present invention is to provide a mouse pad having massage function, which has a massage device and a cushion device that is capable of protecting the massage device from overload and preventing the massage device unexpected interrupt if the operator accidentally exerts an overpressure on the massage device.

To achieve the above-mentioned object, a mouse pad having massage function according to an aspect of the present invention comprises a pad plate for operation of a computer mouse thereon and a rotary massage device disposed on a side of the pad plate. The rotary massage device comprises a massage head and a wheel box. The wheel box is fixed on the pad plate. A motor and a gear-transmission mechanism driven by the motor are mounted in the wheel box. The massage head connects with the gear-transmission mechanism and extends above the wheel box for massaging the operator's wrist. This mouse pad having massage device can operate rotary massage for the operator's wrist besides having the function the conventional mouse pad has. Namely, it is able to massage the wrist to ease the weariness of the wrist while the operator is operating a computer mouse thereon, and ease the operator's discomfort caused by operating the mouse too long time, thus to achieve a health care effect.

In an embodiment of the present invention, the gear-transmission mechanism comprises a worm, a double-gear and a gear wheel. The worm is disposed onto an output shaft of the motor and engages with the double-gear, the double-gear further engages with the gear wheel, and the massage head connects with the gear wheel.

Preferably, the wheel box comprises a box body and a box cover covering on the box body, the gear-transmission mechanism comprises a transmission shaft and two sleeves, one of the sleeves is fixed to the box body, the other sleeve runs through and is fixed to the box cover, the transmission shaft extends through the two sleeves and the gear wheel and protrudes from the box cover, and the massage head is disposed on the protruded end of the transmission shaft.

The mouse pad also comprises an electrical plug connector and a circuit board, the circuit board electrically connects with the electrical plug connector and the motor, and the electrical plug connector electrically connects with external electrical source to supply the power to the motor through the circuit board and, therefore to control the motor to operate.

Perfectly, the rotary massage device is also covered with a sheath, and the sheath comprises an outer layer of wearable cloth and an inner layer of sponge or a rubber further to improve the operator's comfort.

Perfectly, in order to achieve better massage effect, the massage head has a plurality of massage bumps thereon.

A mouse pad having massage function according to another aspect of the present invention comprises a pad plate for operation of a computer mouse thereon, a rotary massage device disposed on a side of the pad plate for supporting an operator's wrist, and a cushion device. The rotary massage device comprises a wheel box and a massage head extending above the wheel box and rotated by the wheel box for massaging the operator's wrist. The cushion device comprises a plurality of spring elements and a holder. The spring elements are disposed between a bottom surface of the wheel box and the pad plate so that the rotary massage device is movable up and down under press of the operator's wrist and resilience of the spring elements. The holder is fixed to the pad plate and extends above the wheel box, and the massage head extends above the holder a predetermined distance, whereby the massage head has a maximum journey of the predetermined distance under the press of the operator's wrist, and any further press can be absorbed by the holder.

In an embodiment of the present invention, the holder is bridged over the wheel box and has a sleeve barrel extending upward to allow the massage head to extend therethrough and thereby to lead the up and down movement of the massage head. Preferably, the holder has a pair of abutments extending downward to be fixed to the pad plate.

Preferably, the pad plate defines a cavity for receiving the rotary massage device and the cushion device therein and further comprises a cover for enclosing the cavity, and the cover has an opening through which the sleeve barrel together with the massage head extends above the cover.

In another embodiment of the present invention, the wheel box defines a plurality of leading holes, and the pad plate forms a plurality of leading pins extending into the respective leading holes to lead the up and down movement of the rotary massage device.

Preferably, the spring elements are helix spring, and the helix springs are disposed on the leading pins.

In still another embodiment of the present invention, a plurality of guide walls is formed on the pad plate and abut against outer surfaces of the wheel box to guide the movement of the rotary massage device.

In comparison with the prior art, as a massage device is disposed on the mouse pad, the massage head of the massage device is able to ease the tension of muscle and tendon of the wrist and promote the blood circulation of the wrist while rotating, thus to achieve a healthcare effect.

In addition, while massaging, if the operator accidentally exerts an overpressure on the massage head, the massage device can move downward the maximum journey to be level with the holder, and then the overpressure is absorbed by the holder, so the massage device is protected from overloaded and prevented from being accidentally interrupted.

The foregoing description of the present invention is only a summarization of the technical solution of the present invention. In order to know the technical methods of this invention clearly and make it be able to be implemented according to the specification, and in order to make the aforementioned and other objects, characteristics and advantages of the present invention more understandable, an preferred embodiment of the invention with reference to the drawings is selected to illustrate the present invention detailedly below.

DETAILED DESCRIPTION OF ILLUSTRATED EMBODIMENTS

Figure 1:
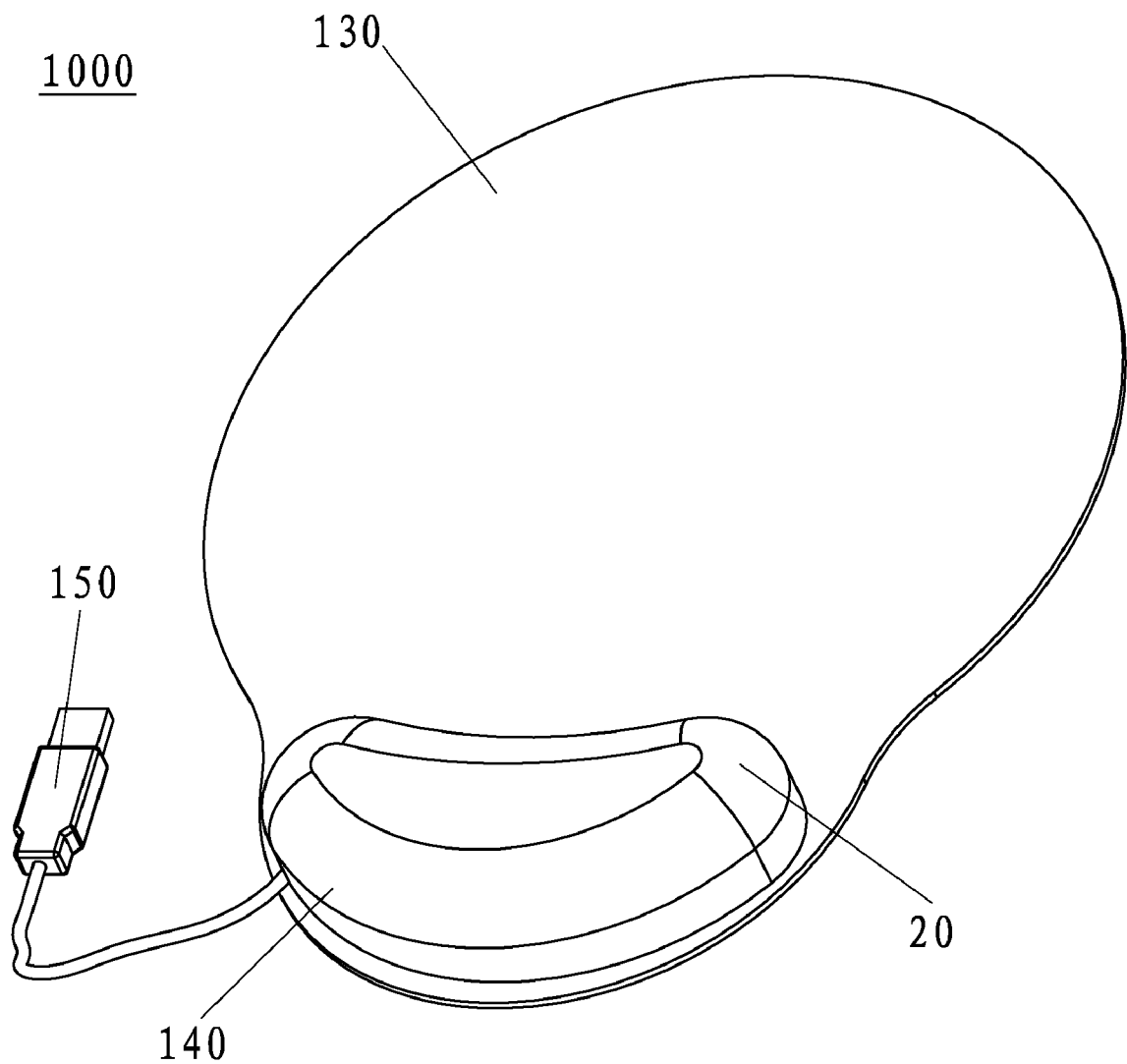
FIG. 1 is an assembled, perspective view of a mouse pad having massage function according to a first embodiment of the present invention.

Various preferred embodiments of the invention will now be described with reference to the figures, wherein like reference numerals designate similar parts throughout the various views.

FIGS. 1-6 show a mouse pad having massage function 1000 according to a first embodiment of the present invention, a detailed description of which will be described hereinafter.

Figure 2:
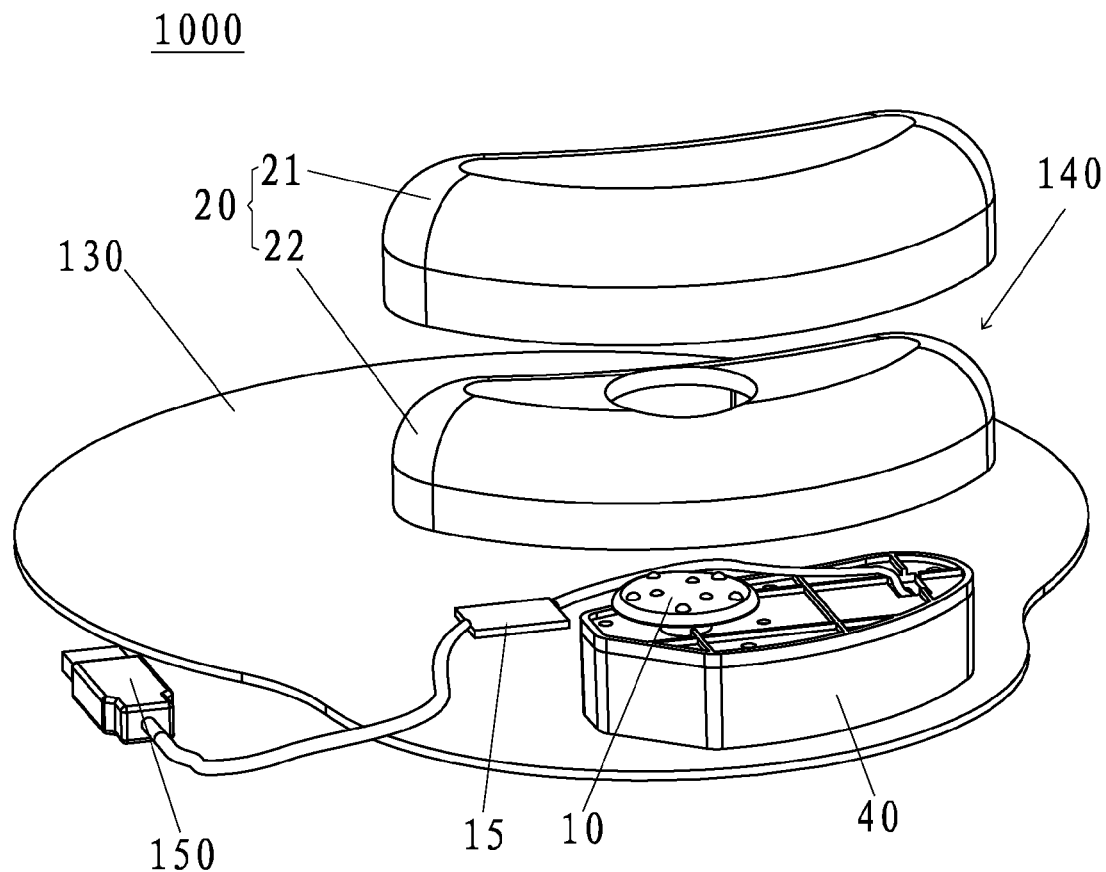
FIG. 2 is an exploded, perspective view of the mouse pad shown in FIG. 1.

Now first referring to FIG. 1 and FIG. 2, the mouse pad having massage function 1000 in accordance with the first embodiment of the present invention comprises a pad plate 130, a rotary massage device 140 disposed on a side of the pad plate 130, and an electrical plug connector 150 connecting with external electrical source to supply power to the rotary massage device 140. When the mouse pad is put on the desk to be used by an operator, the pad plate 130 is provided to place a computer mouse thereon to enable the operator to operate the mouse thereon, and the rotary massage device 140 is at a position corresponding to the operator's wrist, making sure that the operator's wrist is put on the rotary massage device 140.

Figure 3:
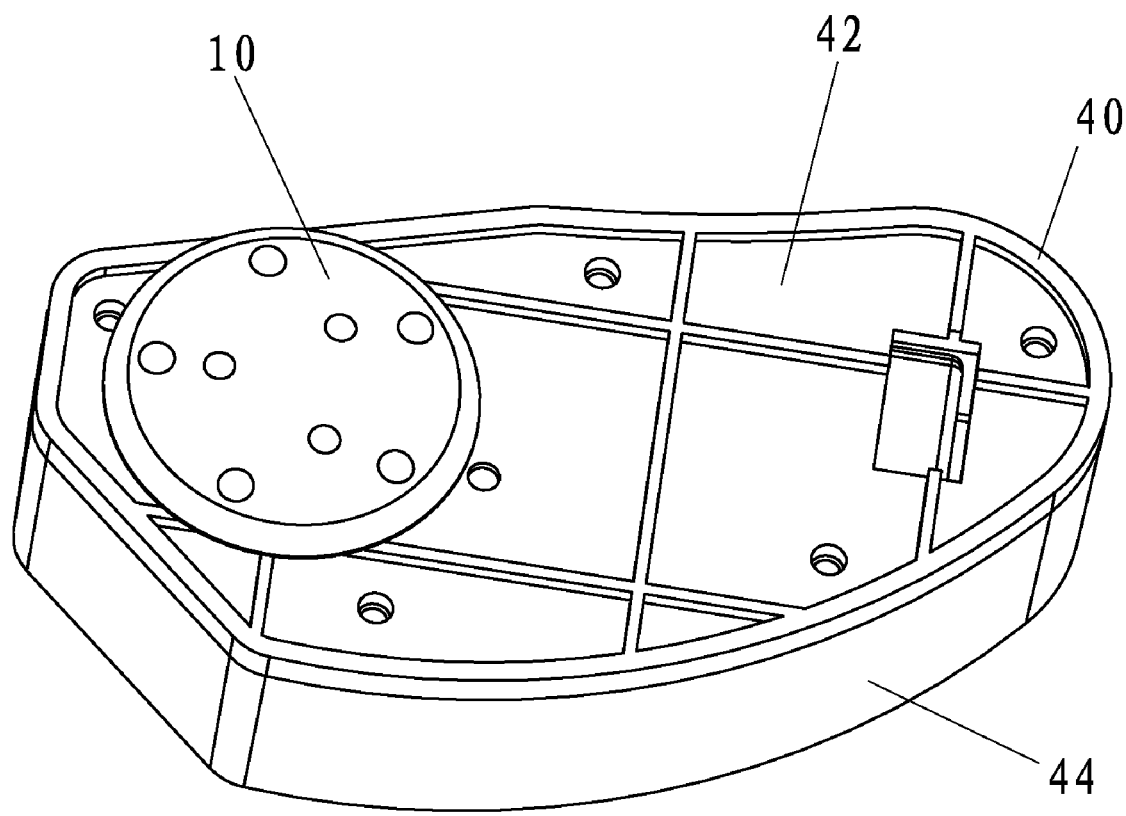
FIG. 3 is a perspective view of a massage device of the mouse pad shown in FIG. 1 with a sheath of the massage device removed.

Referring to FIG. 2 and FIG. 3, the rotary massage device 140 comprises a massage head 10, a wheel box 40 connecting with the massage head 10, a circuit board 15, and a sheath 20 covering the wheel box 40 and the circuit board 15. The circuit board 15 connects with the electrical plug connector 150 and a motor 110 mounted in the wheel box 40 to control the motor 110 to operate. The wheel box 40 drives the massage head 10 to rotate and the rotary of the massage head 10 acts massage on the operator's wrist. The sheath 20 comprises an outer layer of wearable cloth 21 and an inner soft sheath 22.

Figure 4:
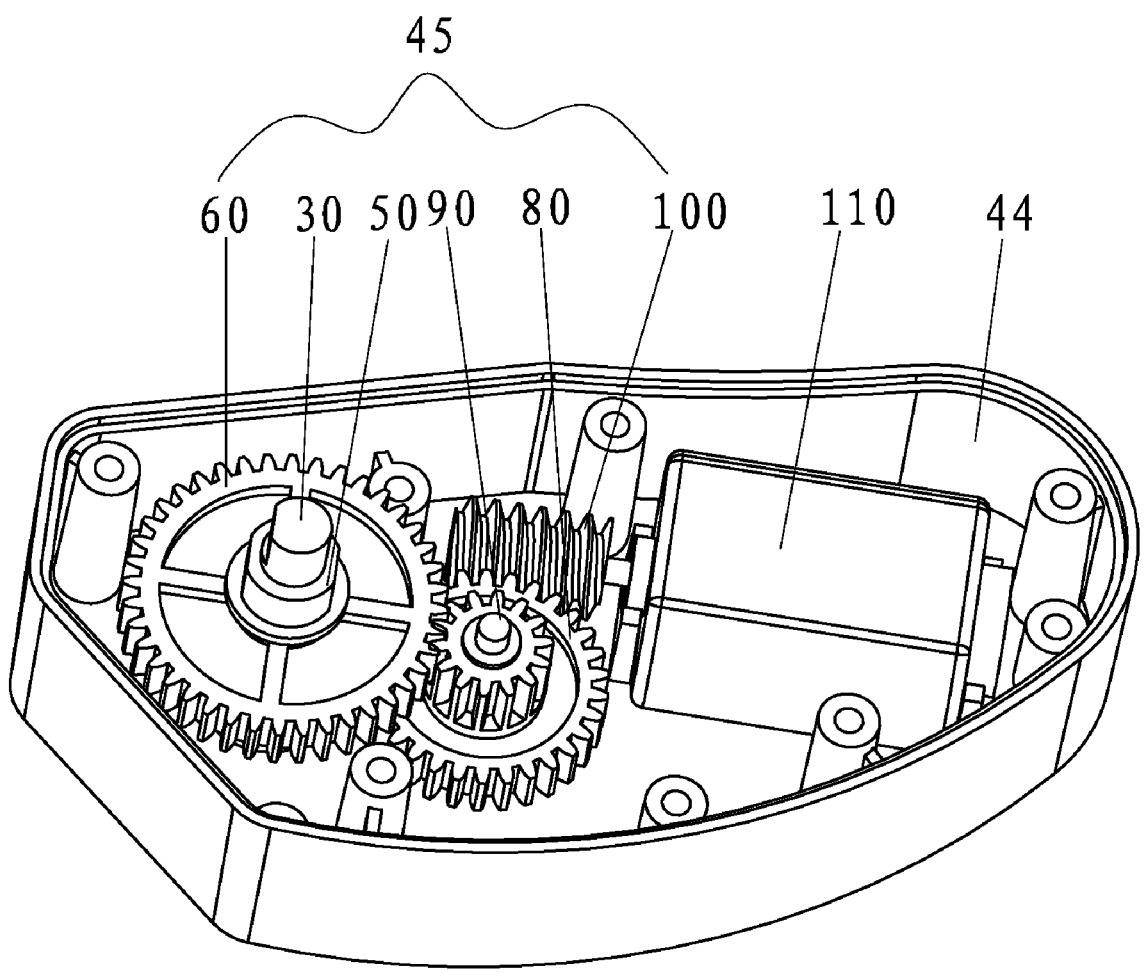
FIG. 4 is a perspective view of a wheel box of the massage device shown in FIG. 3 with a box cover of the wheel box removed.

Referring to FIGS. 3 and 4, the wheel box 40 comprises a box cover 42 and a box body 44, in which the motor 110 and a gear-transmission mechanism 45 driven by the motor 110 are mounted. The massage head 10 connects with a transmission shaft 30 of the gear-transmission mechanism 45 so as to rotate together with the transmission shaft 30 and extends above the wheel box 40 for massaging the operator's wrist.

Figure 5:
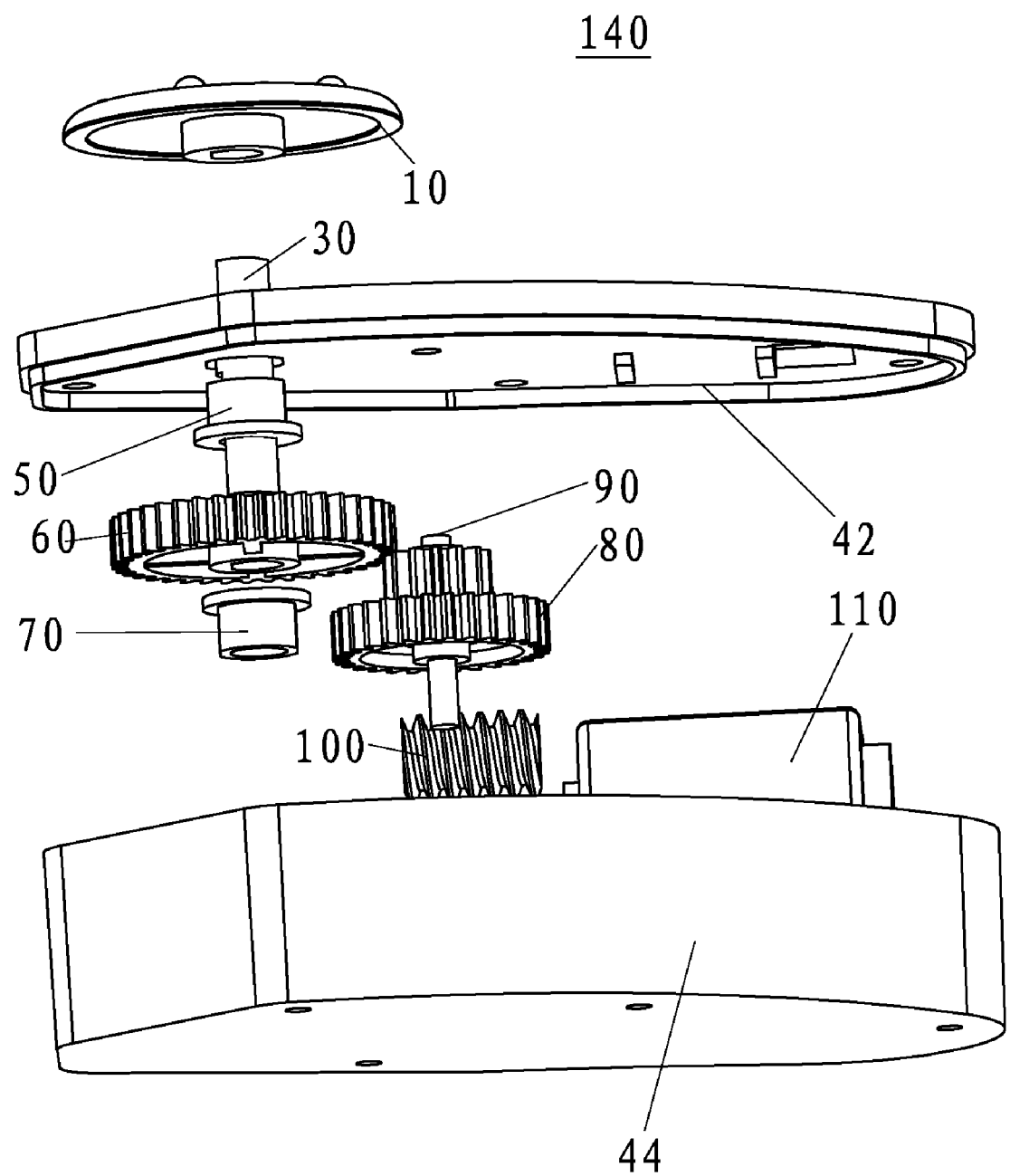
FIG. 5 is an exploded, perspective view of the massage device shown in FIG. 3.
Figure 6:
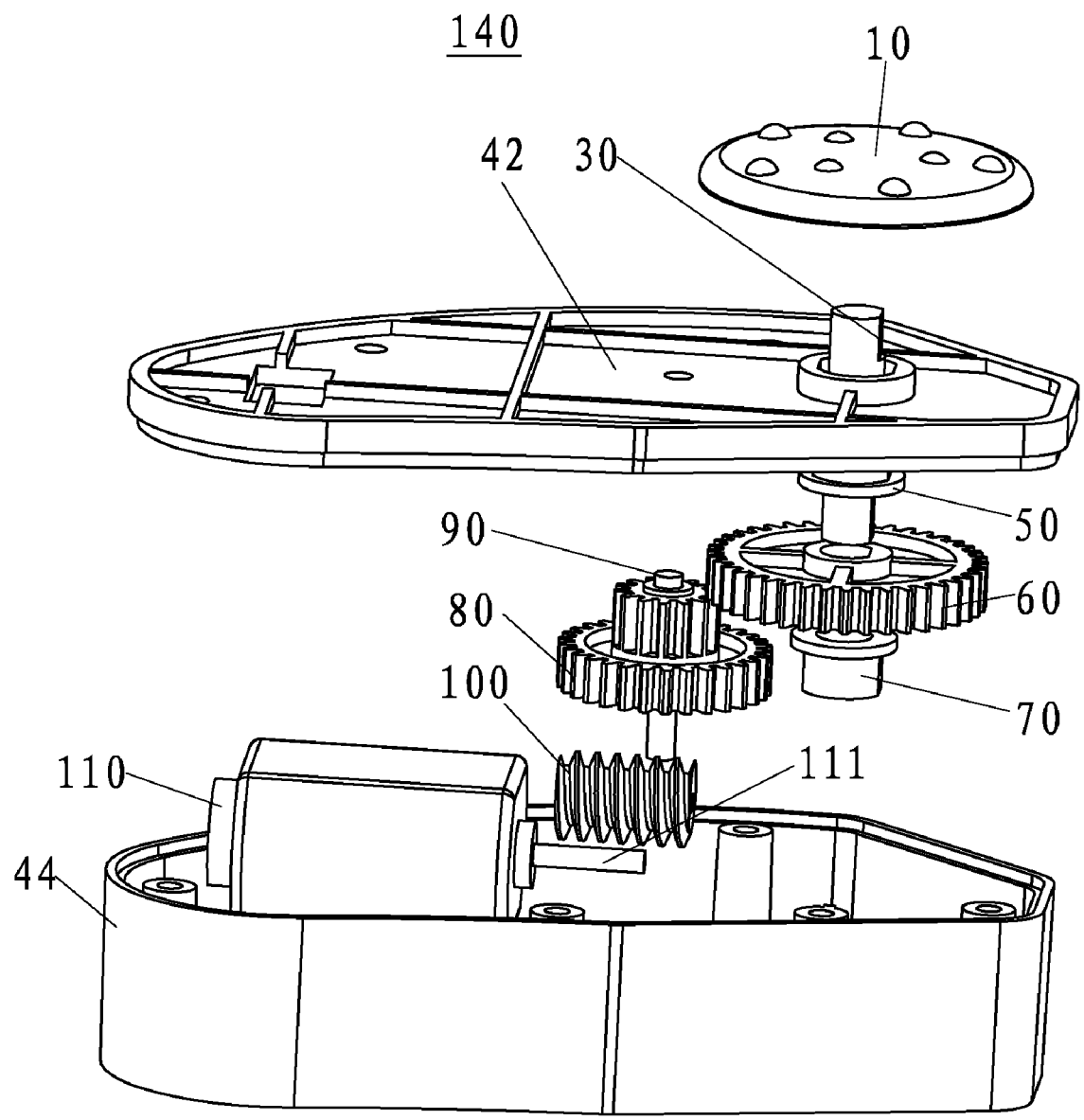
FIG. 6 is an exploded, perspective view of the massage device shown in FIG. 3 seen in another angle.

Referring the FIGS. 4-6, the gear-transmission mechanism 45 comprises a worm 100, a double-gear 80 and a gear wheel 60. The motor 110 is disposed on the bottom of the box body 44. The motor 110 includes an output shaft 111, and the worm 100 is disposed onto the output shaft 111 of the motor 110 and rotates with the output shaft 111 together. A shaft 90 is inserted into a shaft hole in the bottom of the box body 44, and the double-gear 80 is disposed onto the shaft 90. The worm 100 engages with the big gear of the double-gear 80 to drive the double-gear 80 to rotate about the shaft 90 to form the first transmission step. A sleeve 70 is fixed to the bottom of the box body 44, and the other sleeve 50 runs through and is fixed to the box cover 42. The transmission shaft 30 extends through the sleeve 50, the gear wheel 60 and the sleeve 70, and protrudes from the box cover 42. The small gear of the double-gear engages with the gear wheel 60 to drive the gear wheel 60 and the transmission shaft 30 to rotate to form the second transmission step. The massage head 10 is disposed onto the protruded end of the transmission shaft 30 so as to rotate with the transmission shaft 30 together. In this way, once the motor 110 is actuated, it drives the worm 100 to rotate, then the double-gear 80 is driven to rotate through the first transmission step, and then the gear wheel 60 is driven to rotate through the second transmission step. Finally, the massage head 10 follows to rotate to massage the operator's wrist.

The soft sheath 22 can be made from any soft and comfortable materials, such as sponge or rubber. The massage head 10 has a plurality of massage bumps 11 thereon in order to achieve a better massage effect.

The motor 110 can be driven by 5-voltage work power supplied by the USB interface of a desktop computer, so the electrical plug connector 150 can be an USB plug. Under normal condition, as the desktop computer can provide a 5V/500 mA current, the present design introduces a 5V/150 mA motor. When the motor 110 is overloaded and the current reaches 200 mA, the fuse separates automatically to achieve a protection effect. Such protection design is well known to the persons ordinarily skilled in the art, so a detailed description of which is omitted herefrom.

As we all know, while an operator operates a mouse on the mouse pad, sometimes he may suddenly overexert. An overpressure acts on the massage head to cause the massage head to be overloaded. Then the massage device will be interrupted for protection. The operator must restart the massage device for continued massaging. This is inconvenient. To overcome this problem, the present invention also provides a second embodiment.

Now, a mouse pad having massage function 2000 according to the second embodiment of the present invention will be described with reference to FIGS. 7-11 hereinafter.

Figure 7:
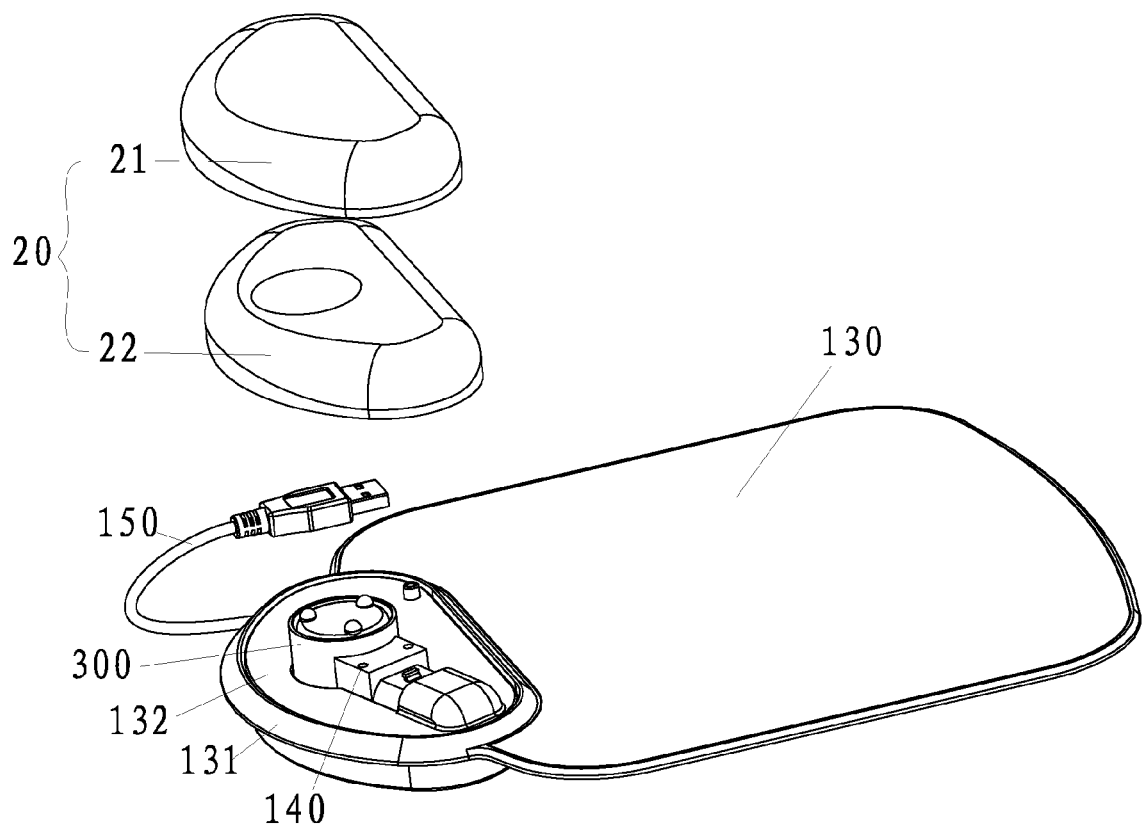
FIG. 7 is a perspective view of a mouse pad having massage function according to a second embodiment of the present invention with a sheath thereof exploded.

Referring to FIG. 7, the mouse pad having massage function 2000 in accordance with the second embodiment of the present invention comprises a pad plate 130 for operation of a computer mouse thereon, a rotary massage device 140 disposed on a side of the pad plate 130, an electrical plug connector 150 connecting with external electrical source to supply power to the rotary massage device 140, a cushion device 300 to protect the massage device 140 from overload and prevent the massage device unexpected interrupt if the operator accidentally exerts an overpressure on the massage device 140, and a sheath 20 covering the rotary massage device 140 and the cushion device 300.

Figure 8:
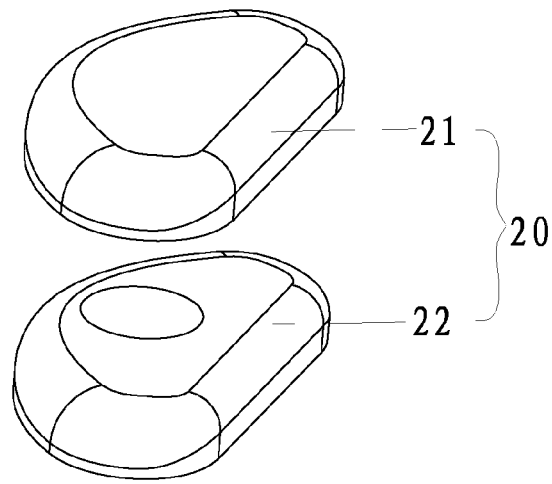
FIG. 8 is a perspective view of the mouse pad shown in FIG. 7 with the sheath and a cover thereof exploded.
Figure 8:
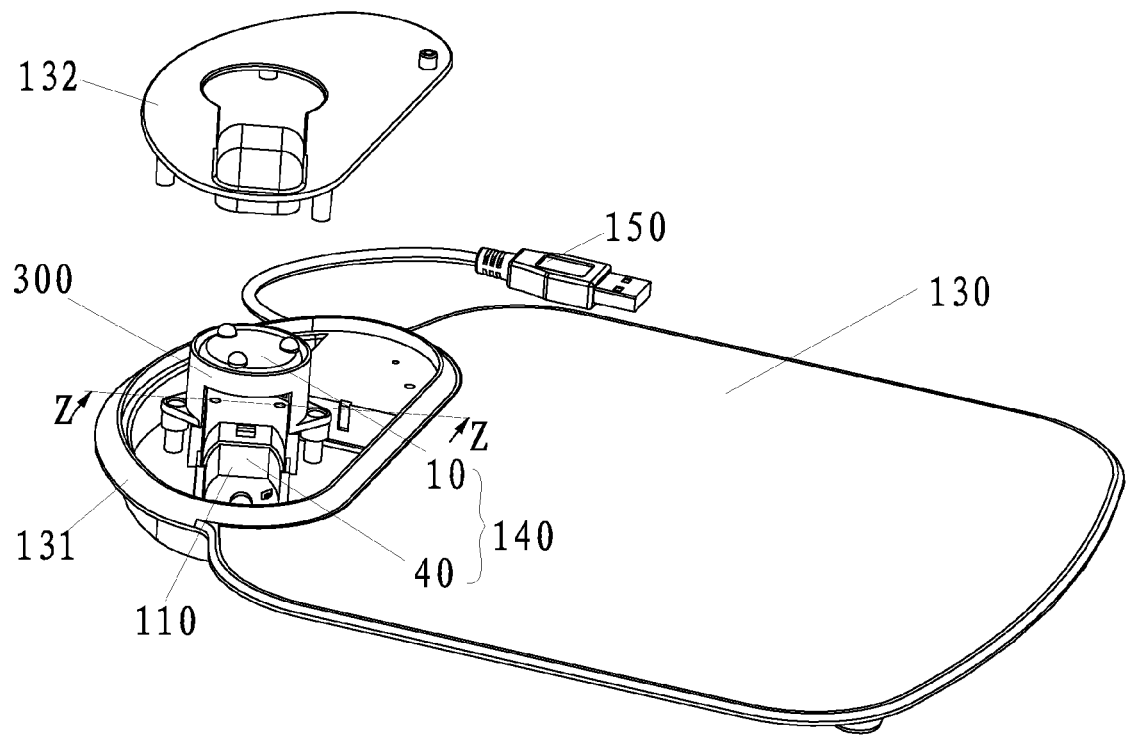
Figure 9:
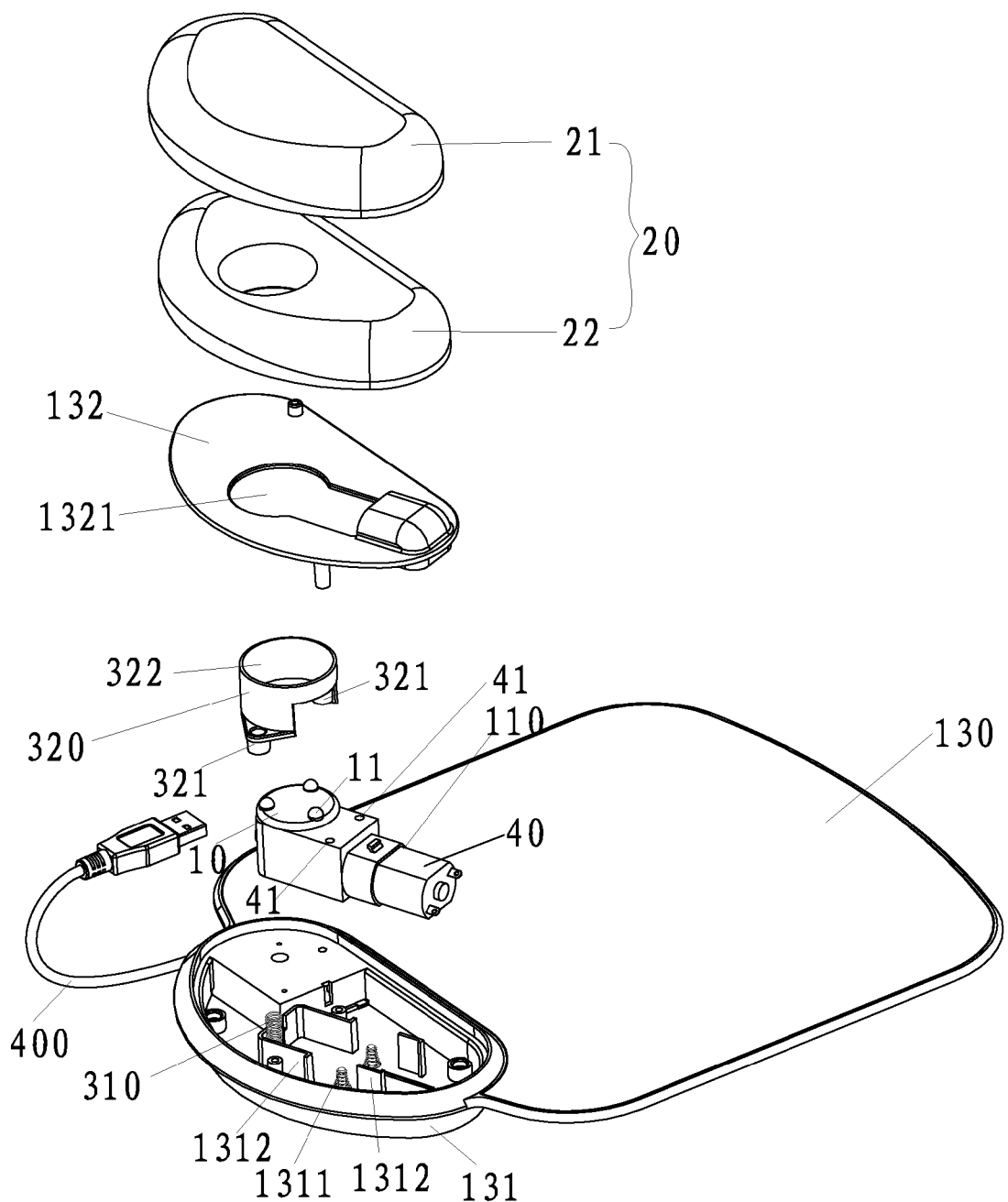
FIG. 9 is an exploded, perspective view of the mouse pad shown in FIG. 7.

The rotary massage device 140, the electrical plug connector 150 and the sheath 20 in the second embodiment are the same as those in the first embodiment, so a detailed description of which is omitted hereinafter. Referring to FIG. 7 and FIG. 8, the most importance differences are that the pad plate 130 defines a cavity 131 for receiving the rotary massage device 140 and has a cover 132 for enclosing the cavity 131. Further referring to FIG. 9, the cavity 131 forms a plurality of leading pins 1311 and a plurality of guide walls 1312 therein extending upward. Corresponding to the leading pins 1311, the wheel box 40 of the rotary massage device 140 defines a plurality of leading holes 41 for receiving the respective leading pins 1311. In assembly, the guide walls 1312 abut against outer surfaces of the wheel box 40 to limit the wheel box 40 therebetween, and the leading pins 1311 extend into the respective leading holes 41. The cover 132 defines an opening 1321 to enable the massage head 10 and partial of the cushion device 300 to extend therethrough and above the cover 132.

Referring to FIG. 8 and FIG. 9 again, another most important difference is the cushion device 300. The cushion device 300 comprises a plurality of spring elements 310 and a holder 320. Preferably, the spring elements 310 are helix spring. The helix spring elements 310 are disposed on the leading pins 1311 with their two ends respectively standing against a bottom surface of the wheel box 40 and an inner surface of the cavity 131, enabling the rotary massage device 140 to be movable up and down under the press of the operator and resilience of the helix spring elements 310. The holder 320 is fixed to the pad plate 130 and bridged over the wheel box 40 by a pair of abutments 321 thereof. The pair of abutments 321 extends downward to be fixed in the cavity 131. Between the pair of abutments 321, a sleeve barrel 322 extends upward to allow the massage head 10 to extend therethrough and the massage head 10 extends above the sleeve barrel 322 a predetermined distance. The sleeve barrel 322 together with the massage head 10 further runs through the opening 1321 and extends above the cover 132. In this way, the cushion device 300 defines a maximum journey of the predetermined distance for the massage head 10. That is to say, under the press of the operator's wrist, the massage head 10 can move downward until level with the sleeve barrel 322. The maximum movement distance is the predetermined distance. Any further press can be absorbed by the holder 320.

Figure 10:
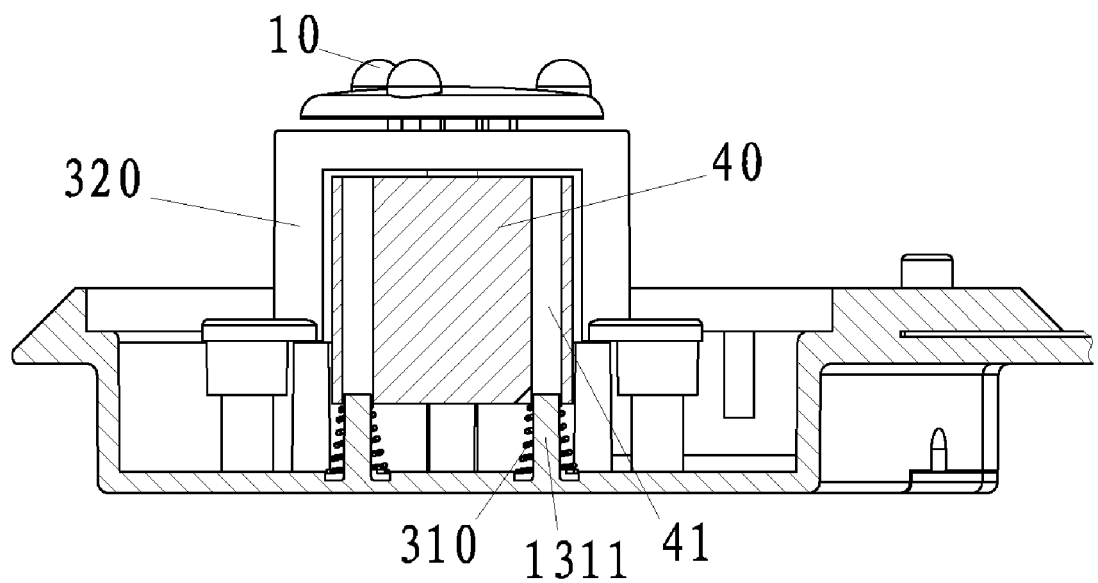
FIG. 10 is a cross-sectional view of FIG. 8 taken along line Z-Z while no press exerting on the massage head.
Figure 11:
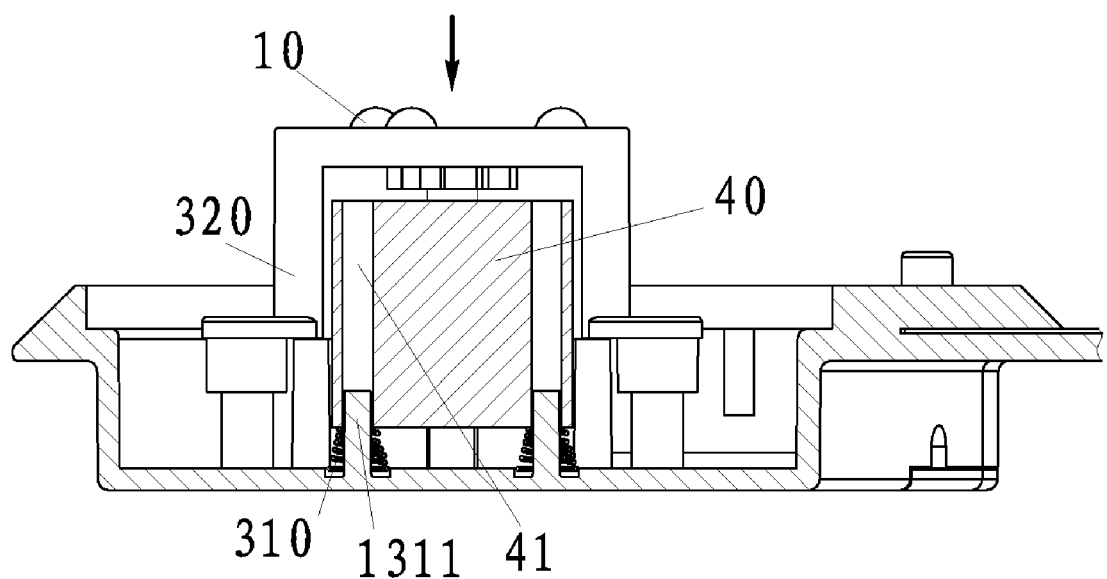
FIG. 11 is a cross-sectional view of FIG. 8 taken along line Z-Z, showing the massage head is pressed to move downward.

Referring to FIG. 10, there is no press on the massage head 10, and the spring elements 310 are at their initial status. Further referring to FIG. 11, when the operator is operating the mouse on the mouse pad, the press shown by the arrowed line is exerted on the massage head 10 by his wrist, the massage device moves downward, and the spring elements 310 are compressed. The engagements of the leading pins 1311 and the leading holes 41, the engagements of the guide walls 1312 and the outer surfaces of the wheel box 40, and the engagement of the sleeve barrel 322 and the massage head 10 all lead the up and down movement of the massage device. If the wrist's press is too great accidentally, the massage head 10 moves to be level with the sleeve barrel 322, then the wrist contact with the sleeve barrel 322 of the holder 320 and the wrist's press can be absorbed by the holder 320. Thereafter, the massage device will not go down anymore. In this way, the massage device will not be overloaded, thus to prevent the massage device unexpected interrupt, and finally achieving an improved massage effect.

It can be seen from the above-mentioned that the mouse pad having the massage device according to the present invention can operate rotary massage for the operator's wrist besides having the function the conventional mouse pad has, namely it is able to massage the wrist to ease the weariness of the wrist while the operator is operating the computer mouse thereon, and ease the operator's discomfort caused by operating the mouse too long time, thus to achieve a health care effect.

In addition, as the introduction of the cushion device, the present invention is capable of protecting the massage device from overload and preventing the massage device unexpected interrupt if the operator accidentally exerts an overpressure on the massage device, achieving an improved massage effect.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A mouse pad having massage function comprising:
    a pad plate for operation of a computer mouse thereon;
    a rotary massage device disposed on a side of the pad plate for supporting an operator's wrist comprises:
        a massage head with round in shape has a plurality of massage bumps on its top surface;
        a wheel box fixed on the pad plate comprises a motor and a gear-transmission mechanism driven by the motor mounted therein;
        the gear-transmission mechanism comprises a worm, a double-gear and a gear wheel, the worm is disposed onto an output shaft of the motor and engages with the double-gear, the double-gear further engages with the gear wheel;
        the massage head is fixed on a transmission shaft of the gear wheel and extends above the wheel box for massaging an operator's wrist when the motor is running.

2. The mouse pad having massage function according to claim 1, wherein the wheel box comprises a box body and a box cover covering on the box body.

3. The mouse pad having massage function according to claim 2, wherein the gear-transmission mechanism comprises a transmission shaft and two sleeves, one of the sleeves is fixed to the box body, the other sleeve runs through and is fixed to the box cover, the transmission shaft extends through the two sleeves and the gear wheel and protrudes from the box cover, the massage head is disposed on the protruded end of the transmission shaft.

4. The mouse pad having massage function according to claim 1, further comprising an electrical plug connector and a circuit board, the circuit board electrically connects the electrical plug connector and the motor.

5. The mouse pad having massage function according to claim 1, wherein the rotary massage device is covered with a sheath.

6. The mouse pad having massage function according to claim 5, wherein the sheath comprises an outer layer of wearable cloth and an inner layer of sponge or rubber.

7. A mouse pad having massage function comprising:
a pad plate for operation of a computer mouse thereon;
a rotary massage device disposed on a side of the pad plate for supporting a operator's wrist comprises:
a massage head with round in shape has a plurality of massage bumps on its top surface;
a wheel box fixed on the pad plate comprises a motor and a gear-transmission mechanism driven by the motor mounted therein;
the gear-transmission mechanism comprises a worm, a double-gear and a gear wheel, the worm is disposed onto an output shaft of the motor and engages with the double-gear, the double-gear further engages with the gear wheel;
the massage head is fixed on a transmission shaft of the gear wheel and extends above the wheel box for massaging an operator's wrist when the motor is running;
a cushion device comprising a plurality of spring elements and a holder, the spring elements being disposed between a bottom surface of the wheel box and the pad plate so that the rotary massage device is movable up and down under press of the operator's wrist and resilience of the spring elements, thereby, the massage device is protected from accidental overload and overpressure from operator.

8. The mouse pad having massage function according to claim 7, wherein the holder is bridged over the wheel box and has a sleeve barrel extending upward to allow the massage head to extend there through and thereby to lead the up and down movement of the massage head.

9. The mouse pad having massage function according to claim 8, wherein the pad plate defines a cavity for receiving the rotary massage device and the cushion device therein and further comprises a cover for enclosing the cavity, and the cover has an opening through which the sleeve barrel together with the massage head extends above the cover.

10. The mouse pad having massage function according to claim 8, wherein the holder has a pair of abutments extending downward to be fixed to the pad plate.

11. The mouse pad having massage function according to claim 7, wherein the wheel box defines a plurality of leading holes, and the pad plate forms a plurality of leading pins extending into the respective leading holes to lead the up and down movement of the rotary massage device.

12. The mouse pad having massage function according to claim 11, wherein the spring elements are helix spring, and the helix springs are disposed on the leading pins.

13. The mouse pad having massage function according to claim 7, wherein a plurality of guide walls are formed on the pad plate and abut against outer surfaces of the wheel box to guide the movement of the rotary massage device.

14. The mouse pad having massage function according to claim 7, wherein the rotary massage device and the cushion device are covered with a sheath.

15. The mouse pad having massage function according to claim 14, wherein the sheath comprises an outer layer of wearable cloth and an inner layer of sponge or rubber.

* * * * *